Figure 1:
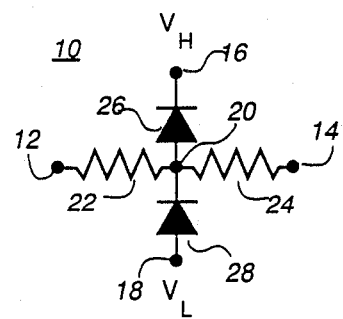

United States Patent [19]

Sitch

[11] Patent Number: 4,930,036
[45] Date of Patent: May 29, 1990

[54] ELECTROSTATIC DISCHARGE PROTECTION CIRCUIT FOR AN INTEGRATED CIRCUIT

[75] Inventor: John E. Sitch, Ottawa, Canada

[73] Assignee: Northern Telecom Limited, Montreal, Canada

[21] Appl. No.: 379,126

[22] Filed: Jul. 13, 1989

[51] Int. Cl.$^5$ .............................................. H02H 9/04
[52] U.S. Cl. ...................................... 361/56; 361/58; 361/111
[58] Field of Search ..................... 361/56, 58, 91, 111; 357/23.13

[56] References Cited

U.S. PATENT DOCUMENTS

| | | | |
|---|---|---|---|
| 3,777,216 | 12/1973 | Armstrong | 361/111 |
| 4,131,928 | 12/1978 | Davis et al. | 361/91 |
| 4,423,431 | 12/1983 | Sasaki | 361/56 |
| 4,858,055 | 8/1989 | Okitaka | 361/56 |

Primary Examiner—Todd E. Deboer
Attorney, Agent, or Firm—Dallas F. Smith

[57] ABSTRACT

A terminal of an integrated circuit is protected from electrostatic discharge voltages at the terminal by a protection circuit which includes a bidirectionally conductive transistor as a discharge current shunting device. A bidirectionally conductive controlled path is provided between the terminal and one of two voltage supply terminals. The transistor has a biassing resistor connected between the terminal and its control electrode. A normally reverse biassed diode is connected between the control electrode on another of the voltage supply terminals. For an n-channel FET or an npn bipolar transistor, when a positive electrostatic discharge is applied to the terminal, a current flowing through the biassing resistor turns on the transistor to provide a discharge path from the terminal to the voltage supply terminal. When a negative electrostatic discharge is applied to the terminal, the diode is forward biassed and a resulting current flow through the biassing resistor turns on the transistor to provide a discharge path from the voltage supply terminal to the terminal. The transistor may be either a symmetrical bipolar transistor or an enhancement mode FET. An embodiment of the circuit for protecting a gallium arsenide integrated circuit (GaAs IC) uses an enhancement mode MESFET and a Schottky barrier diode. For a p-channel FET or a pnp bipolar transistor the polarity of the discharge is reversed.

23 Claims, 3 Drawing Sheets

ELECTROSTATIC DISCHARGE PROTECTION CIRCUIT FOR AN INTEGRATED CIRCUIT

This invention relates to an electrostatic discharge protection circuit for an integrated circuit.

It is well known to provide electrostatic discharge (ESD) protection for terminals of a GaAs (Gallium Arsenide) integrated circuit. Protection circuits may be categorized as high impedance, matched or low impedance protection circuits.

A high impedance protection circuit limits the discharge current to a safe level. Most of the voltage of the discharge appears at the terminals of the protection circuit, with most of the energy of the discharge being dissipated within the protection circuit. The peak power dissipation and discharge duration within the protection circuit are dependent upon the current allowed by the protection circuit.

A matched protection circuit causes the voltage and the energy of the discharge to be shared equally between the internal resistance of the discharge source and the protection circuit.

A low impedance protection circuit effectively short-circuits the discharge to ground. While a high current flows through the protection circuit, because of its low impedance, most of the energy of the discharge is dissipated within the source and most of the voltage drop occurs within the source. The duration of the discharge within the protection circuit is dependent upon the source.

High impedance and matched ESD protection circuits use comparatively large value resistors in series with a signal path to or from the integrated circuit terminals. These resistors couple with capacitances to ground to form low-pass filters which may lead to undesirable restrictions in frequency response. For GaAs or other high-speed integrated circuits such low-pass input structures are unacceptable. In addition, such large value resistors can not be used on output connections for which a low output impedance is desired.

An object of the present invention is to provide an improved electrostatic discharge protection circuit for a GaAs integrated circuit.

In accordance with one aspect of the present invention there is provided an electrostatic discharge protection circuit for a GaAs integrated circuit, comprising: a first terminal; second and third terminals for receiving respective supply voltages; a transistor having a control electrode and a bidirectionally conductive controlled path coupled between the first terminal and the second terminal; resistance means coupled between the control electrode and the first terminal for rendering the transistor conductive in a first direction in response to an electrostatic discharge potential of a first polarity at the first terminal; diode means coupled between the control electrode and the third terminal for rendering the transistor conductive in a second direction in response to an electrostatic discharge potential of a second polarity at the first terminal, the second polarity being opposite to the first polarity; and means for coupling a terminal of a GaAs integrated circuit to the resistance means.

In an embodiment of the present invention the transistor comprises an enhancement mode field-effect transistor (FET) whose gate serves as the control electrode. Preferably, the FET comprises a metal semiconductor field-effect transistor (MESFET).

In accordance with another aspect of the present invention there is provided an integrated circuit, comprising: an external connection terminal; an internal connection point; first and second voltage supply terminals; and an electrostatic discharge protection circuit coupling the internal connection point to the external connection terminal, the protection circuit comprising: a transistor having a control electrode and a bidirectionally conductive controlled path coupled between the external connection terminal and the first voltage supply terminal; resistance means coupled between the control electrode and the external connection terminal for rendering the transistor conductive in a first direction in response to an electrostatic discharge potential of a first polarity at the external connection terminal; and diode means coupled between the control electrode and the second voltage supply terminal for rendering the transistor conductive in a second direction in response to an electrostatic discharge potential of a second polarity at the external connection terminal, the second polarity being opposite to the first polarity; the internal connection point being coupled to the resistance means.

In accordance with a further aspect of the present invention there is provided a GaAs integrated circuit including at least one terminal having an electrostatic discharge protection circuit coupled thereto, the electrostatic discharge protection circuit comprising: a first terminal; second and third terminals for receiving respective supply voltages; a transistor having a control electrode and a bidirectionally conductive controlled path coupled between the first terminal and the second terminal; resistance means coupled between the control electrode and the first terminal for rendering the transistor conductive in a first direction in response to an electrostatic discharge potential of a first polarity at the first terminal; and diode means coupled between the control electrode and the third terminal for rendering the transistor conductive in a second direction in response to an electrostatic discharge potential of a second polarity at the first terminal, the second polarity being opposite to the first polarity; and means for coupling the terminal of the GaAs integrated circuit to the resistance means.

Thus in accordance with the invention the electrostatic protection circuit is included as a portion of the GaAs integrated circuit whose terminal is being protected.

Figure 2:
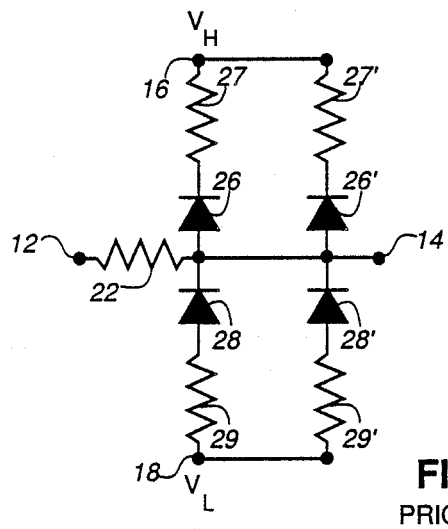
Figure 3:
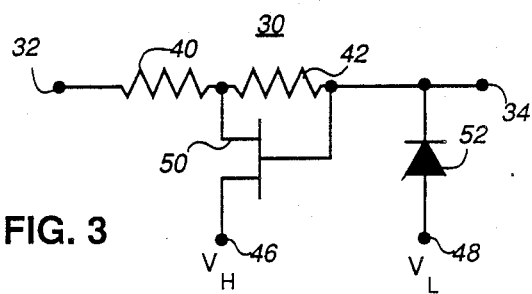
Figure 4:
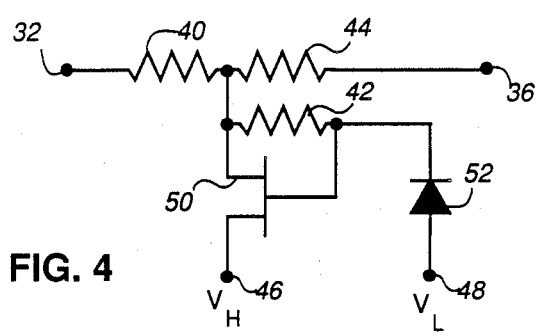
Figure 5:
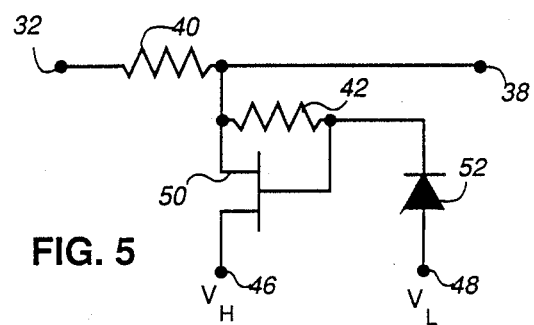
Figure 6:
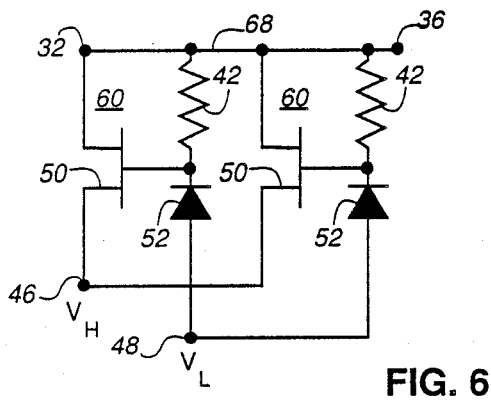
Figure 7:
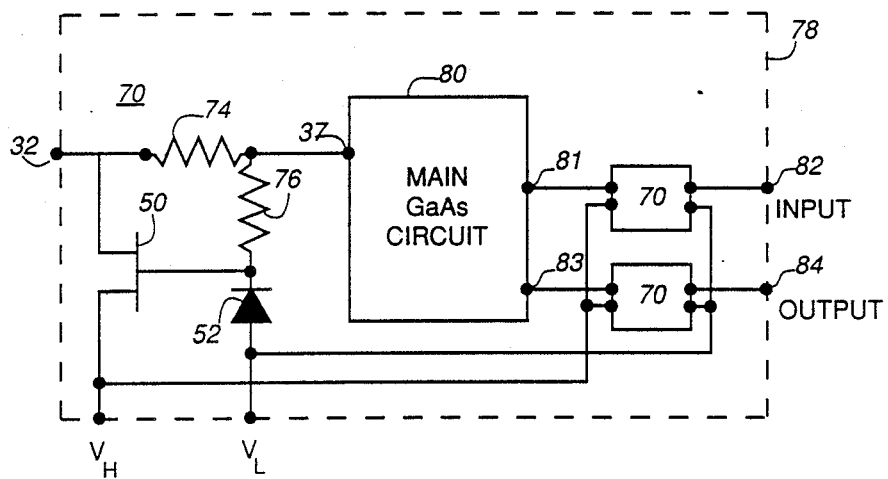

The present invention will be further understood from the following description with reference to the drawings, in which:

FIG. 1 schematically illustrates a known ESD protection circuit;

FIG. 2 schematically illustrates a known current sharing arrangement of two of the circuits of FIG. 1;

FIG. 3 schematically illustrates an ESD protection circuit in accordance with an embodiment of the present invention;

FIG. 4 schematically illustrates the ESD protection circuit of FIG. 3, with an alternative internal connection terminal;

FIG. 5 schematically illustrates the ESD protection circuit of FIG. 3, with an alternative internal connection terminal;

FIG. 6 schematically illustrates a current sharing arrangement of two of the circuits of FIG. 3; and FIG. 7 schematically illustrates an ESD protection circuit provided as a part of a GaAs integrated circuit.

Similar references are used in different figures to denote similar components.

Referring to FIG. 1, a known ESD protection circuit 10 comprises terminals 12 and 14, series resistors 22 and 24 connected in series between the terminals 12 and 14, high level $V_H$ and low level $V_L$ voltage supply terminals 16 and 18, respectively, and normally reverse biassed Schottky barrier diodes 26 and 28 connected in series between the voltage supply terminals 16 and 18. The diodes 26 and 28 and the resistors 22 and 24 are coupled together at a junction point 20.

In operation, the resistor 22 acts to prevent ringing that may occur due to resonance of reactive components in an integrated circuit to which the circuit 10 is coupled via the terminal 12, with a capacitance of the circuit 10. The diode 26 becomes forward biassed and conducts whenever the voltage at the terminal 14 rises above $V_H$ and the diode 28 becomes forward biassed and conducts whenever the voltage at the terminal 14 falls below $V_L$. Whichever diode 26 or 28 is forward biassed by an ESD potential at the terminal 14 conducts current to the supply and hence to ground. The resistor 24 limits current flow to an acceptable level.

With the diodes 26 and 28, local non-uniformities may lead to localized heating which may cause thermal runaway and degradation of the diode. Such degradation may result in increased reverse leakage of the diode.

The resistors 22 and 24 are essential to the protection circuit 10, but provide a relatively high impedance which lowers the pass band of the protection circuit and make it undesirable for protecting output terminals of an integrated circuit.

To overcome the problem of excessive current in the circuit of FIG. 1, several such circuits can be provided in parallel to share the ESD current, for example two circuits as is schematically illustrated in FIG. 2. In this circuit the resistor 24 of FIG. 1 has to be replaced by resistors 27, 27' and 29, 29', which are ballast resistors required for balancing current within the arrangement. Without such resistors the first diode forward biassed by the ESD potential, for example the diode 26 or 28, would attempt to conduct all of the current. The presence of the resistors 27 and 29 limits the current which can flow through the diodes 26 and 28, respectively, allowing the other forward biassed diode 26' or 28' to conduct a share of the current. Being placed in the discharge current path, the resistors 27, 27' and 29, 29' reduce the effectiveness of the protection due to the limiting of current allowed to flow to the respective voltage supply terminal.

Referring to FIG. 3, an ESD protection circuit in accordance with an embodiment of the present invention comprises an external connection terminal 32, constituting an external connection terminal of a GaAs IC (gallium arsenide integrated circuit), which may be exposed to ESD potential, and an internal connection terminal 34 for coupling to an input or output connection of the GaAs IC which is thereby protected from ESD. Resistors 40 and 42 are connected in series between the terminals 32 and 34. A FET 50 has a source connected to a junction between the resistors 40 and 42, a gate connected to the internal connection terminal 34, and a drain connected to a high level $V_H$ voltage supply terminal 46. A diode 52 has a cathode connected to the terminal 34 and an anode connected to a low level $V_L$ voltage supply terminal 48. Preferably, the FET 50 comprises a MESFET and the diode 52 comprises a Schottky barrier diode.

In operation, for an n-channel FET 50, an ESD potential of positive polarity at the external terminal 32 causes a forward bias on the gate of the FET 50, turning on the FET 50 to allow current flow from the terminal 32 to the voltage supply terminal 46. Current to the gate of the FET 50 is limited by the resistor 42. An ESD of negative polarity at the external terminal 32 causes the diode 52 to be forward biassed via the resistors 40 and 42. A potential difference developed across the resistor 42 turns on the FET 50 to allow current flow from the voltage supply terminal 46 to the terminal 32 through the resistor 40. For a p-channel FET the polarity of the discharge is reversed.

FIG. 4 schematically illustrates the circuit of FIG. 3 with an alternative internal connection terminal 36 in place of the terminal 34. The terminal 36 is connected via a resistor 44 to the junction between the resistors 40 and 42. The circuit operates in the same manner as that of FIG. 3.

FIG. 5 schematically illustrates the circuit of FIG. 3 with another alternative internal connection terminal 38 in place of the terminal 34. The terminal 38 is connected directly to the junction between the resistors 40 and 42. The circuit operates in the same manner as that of FIG. 3.

The embodiments of the invention of FIGS. 3–5 differ from one another only in the manner of connection of the internal terminal. In each of these circuits the resistor 40 is optional and can be omitted. When present, it can have a resistance in a range of about 10 ohms to about 50 ohms to damp out ringing that may occur due to resonance of reactive components in the integrated circuit connected to the terminal 34, 36, or 38. The resistor 40 also provides some protection to the integrated circuit against voltages, outside the range of the supply voltages but less than ESD potentials, that may be improperly applied to the external terminal 32.

As the resistor 40 is in series in the signal path with the bias resistor 42 of FIG. 3, or the resistor 44 of FIG. 4, the presence of the resistor 40 and the determination of which protection circuit (FIG. 3, 4, or 5) to use depend upon several factors. These factors include: the desired frequency response, whether the integrated circuit terminal being protected is an input or output connection, and the degree of protection required by the specific device being protected. As discussed above, the frequency response depends upon the coupling of series resistance to circuit capacitance to form a low pass filter. The frequency response available therefore depends on both the capacitance of the device being protected and the signal path resistance as determined by the susceptibility of the device to ESD. If the device is susceptible, a higher resistance must be used in the signal path. If such device also has a relatively high capacitance, the combination of the high resistance in the signal path and the high capacitance will limit the frequency response to the device.

Thus, the circuit of FIG. 3 provides a lower leakage with a lower cutoff frequency, the circuit of FIG. 4 provides a limit to leakage without capacitance associated with the terminal 36, while the circuit of FIG. 5 provides a lower resistance path from the external terminal 32 to the internal terminal 38 and hence a higher cutoff frequency but a lower level of protection. For use with integrated circuit output drivers, the circuit of FIG. 5 may be used with a small value of resistor 40 to maintain a low output impedance, while providing a sufficient level of ESD protection.

For a data rate of up to about 700 Mbit/s, the resistor values range from about 10 ohms to about 50 ohms for the resistor 40 and from about 50 ohms to 1000 ohms, typically 200 ohms, for the resistor 44. With the circuit of FIG. 3 or 5, for a data rate of up to about 2.5 Gbit/s the resistor 40 can have a resistance of about 10 ohms. The resistance of the bias resistor 42 depends upon the type of the transistor 50 used, and for a GaAs MESFET may be typically about 200 ohms for a data rate of up to approximately 700 Mbit/s.

Any of the circuits of FIG. 3-5 may be used for protection of integrated circuit inputs, while for outputs the circuit of FIG. 5 is preferred to provide a low impedance. The ESD protection circuit is operable whether or not the integrated circuit is powered, provided there are paths from the voltage supply terminals to ground when the integrated circuit is not powered.

FIG. 6 schematically illustrates an embodiment of the present invention providing a current sharing arrangement. If, in the circuits of FIGS. 3-5, the gate current of the FET 50 or the current in the diode 52 is likely to become large enough for non-uniform burnout to occur, several protection circuits 60 can be provided in a parallel arrangement as shown in FIG. 6 to share the ESD current. The arrangement of FIG. 6 has two protection circuits 60, but more may be provided as required.

In the arrangement of FIG. 6, each protection circuit 60 is as described above with references to FIG. 4, and operates in the same manner with the resistors 42 acting as current-sharing ballast resistors for the diodes 52, except that the resistors 40 and 44 are omitted. Thus there is a common bus 68, to which all of the circuits 60 are connected, extending between the external connection terminal 32 and the internal connection terminal 36. Either or both of the resistors 40 and 44 may also be provided in this arrangement between the bus 68 and the respective terminal 32 or 36.

Referring to FIG. 7, a further alternative form of protection circuit 70 is illustrated as being provided within a GaAs integrated circuit 78 between an external terminal 32 of the integrated circuit and an internal terminal 37 coupled to a main GaAs circuit 80. The voltage supply terminals $V_H$ and $V_L$ of the circuit couple to the respective supplies provided to the integrated circuit. The protection circuit shown includes a FET 50 and a diode 52, connected as described above, and two resistors 74 and 76 providing in series a biassing resistance for the FET 50, while reducing the resistance within the signal path between the terminals 32 and 37. Additional protection circuits 70 are illustrated in block form between internal terminals 81 and 83 and integrated circuit input terminal 82 and integrated circuit output terminal 84, respectively. A resistor 40 (not shown) may be provided, connected to the terminal 32 as in the circuits of FIGS. 3-5.

Embodiments of the invention as described above have several further advantages over the prior art. The FET does not suffer the same localized irregularities as the diode of the prior art circuit, and can therefore handle higher current. The circuit provides input and output options which can trade frequency response for protection level as a particular application requires The circuit of FIG. 5 is particularly suitable for use for the output terminals of a GaAs integrated circuit. When used in a current sharing arrangement, the FETs do not require ballasting resistors in the discharge path as their biassing resistors ensure that any initial current due to an ESD potential is distributed among the protection circuits.

Numerous other modifications, variations and adaptations may be made to the particular embodiments of the invention described above without departing from the scope of the invention as defined in the claims. For example, the FETs may be replaced by bidirectional bipolar transistors, n-channel by npn and p-channel by pnp, respectively, and the protection circuit can be used for protecting other than GaAs integrated circuit terminals.

What is claimed is:

1. An electrostatic discharge protection circuit for a GaAs integrated circuit, comprising:
   a first terminal;
   second and third terminals for receiving respective high and low level supply voltages;
   a transistor having a control electrode and a bidirectionally conductive controlled path coupled between the first terminal and the second terminal;
   resistance means coupled between the control electrode and the first terminal for rendering the transistor conductive in a first direction in response to an electrostatic discharge potential of a first polarity at the first terminal;
   diode means coupled between the control electrode and the third terminal for rendering the transistor conductive in a second direction in response to an electrostatic discharge potential of a second polarity at the first terminal, the second polarity being opposite to the first polarity; and
   means for coupling a terminal of a GaAs integrated circuit to the resistance means.

2. A circuit as claimed in claim 1 wherein the transistor comprises an enhancement mode FET having a gate which constitutes the control electrode.

3. A circuit as claimed in claim 2 wherein the FET comprises a MESFET.

4. A circuit as claimed in claim 1 wherein the diode means comprises a Schottky barrier diode.

5. A circuit as claimed in claim 1 wherein the means for coupling is connected to a junction between the resistance means and the control electrode.

6. A circuit as claimed in claim 1 wherein the means for coupling is connected to a junction between the resistance means and the controlled path of the transistor.

7. A circuit as claimed in claim 1 wherein the means for coupling includes a series resistor.

8. A circuit as claimed in claim 1 and comprising a resistor connected in series with the controlled path of the transistor between the first and second terminals.

9. An integrated circuit, comprising:
   an external connection terminal;
   an internal connection point;
   first and second voltage supply terminals for supplying respective high and low level voltage; and
   and at least one electrostatic discharge protection circuit coupling the internal connection point to the external connection terminal, the protection circuit comprising:
   a transistor having a control electrode and a bidirectionally conductive controlled path coupled between the external connection terminal and the first voltage supply terminal;
   resistance means coupled between the control electrode and the external connection terminal for rendering the transistor conductive in a first direction in response to an electrostatic discharge potential of a first polarity at the external connection terminal; and diode means coupled between the control electrode and the second voltage supply terminal for rendering the transistor conductive in a second direction in response to an electrostatic discharge potential of a second polarity at the external connection terminal, the second polarity being opposite to the first polarity;

the internal connection point being coupled to the resistance means.

10. An integrated circuit as claimed in claim 9 wherein the internal connection point is coupled to a junction between the resistance means and the control electrode.

11. An integrated circuit as claimed in claim 10 and including a resistor connected in series between the controlled path of the transistor and the external connection terminal.

12. An integrated circuit as claimed in claim 9 wherein the resistance means comprises two resistors connected in series with one another and wherein the internal connection point is coupled to a junction between the two resistors.

13. An integrated circuit as claimed in claim 12 and including a resistor connected in series between the controlled path of the transistor and the external connection terminal.

14. An integrated circuit as claimed in claim 9 wherein the internal connection point is coupled to a junction between the resistance means and the controlled path of the transistor.

15. An integrated circuit as claimed in claim 14 and including a resistor via which the internal connection point is coupled to the junction between the resistance means and the controlled path of the transistor.

16. An integrated circuit as claimed in claim 15 and including a resistor connected in series between the controlled path of the transistor and the external connection terminal.

17. An integrated circuit as claimed in claim 14 and including a resistor connected in series between the controlled path of the transistor and the external connection terminal.

18. An integrated circuit as claimed in claim 9 and including a plurality of said protection circuits, substantially identical to one another, connected in parallel.

19. An integrated circuit as claimed in claim 9 and including a resistor connected in series between the controlled path of the transistor and the external connection terminal.

20. An integrated circuit as claimed in claim 9 and including a plurality of said protection circuits, substantially identical to one another, connected in parallel, and a resistor connected in series between the controlled paths of the transistors of the protection circuits and the external connection terminal.

21. A GaAs integrated circuit including at least one terminal and an electrostatic discharge protection circuit coupled thereto, the electrostatic discharge protection circuit comprising:

a first terminal;

second and third terminals for receiving respective high and low level supply voltages;

a transistor having a control electrode and a bidirectionally conductive controlled path coupled between the first terminal and the second terminal;

resistance means coupled between the control electrode and the first terminal for rendering the transistor conductive in a first direction in response to an electrostatic discharge potential of a first polarity at the first terminal;

diode means coupled between the control electrode and the third terminal for rendering the transistor conductive in a second direction in response to an electrostatic discharge potential of a second polarity at the first terminal, the second polarity being opposite to the first polarity; and means for coupling the terminal of the GaAs integrated circuit to the resistance means.

22. A circuit as claimed in claim 21 wherein the means for coupling is connected to a junction between the resistance means and the control electrode.

23. A GaAs integrated circuit as claimed in claim 21 wherein said at least one terminal comprises an output terminal of the integrated circuit.

* * * * *